United States Patent
Plokker

(10) Patent No.: US 10,150,554 B2
(45) Date of Patent: Dec. 11, 2018

(54) INJECTION MOLDING METHOD FOR THE MANUFACTURE OF A PRIMARY-STRUCTURE CONNECTION ELEMENT

(71) Applicant: Airbus Operations GmbH, Hamburg (DE)

(72) Inventor: Matthijs Plokker, Harsefeld (DE)

(73) Assignee: Airbus Operations GmbH (DE)

( * ) Notice: Subject to any disclaimer, the term of this patent is extended or adjusted under 35 U.S.C. 154(b) by 408 days.

(21) Appl. No.: 14/995,514

(22) Filed: Jan. 14, 2016

(65) Prior Publication Data
US 2016/0129987 A1 May 12, 2016

Related U.S. Application Data

(63) Continuation of application No. PCT/EP2014/063088, filed on Jun. 23, 2014.

(30) Foreign Application Priority Data

Jul. 16, 2013 (DE) .................. 10 2013 107 551

(51) Int. Cl.
*B64C 1/12* (2006.01)
*B29C 45/00* (2006.01)
(Continued)

(52) U.S. Cl.
CPC ............ *B64C 1/12* (2013.01); *B29C 45/0005* (2013.01); *B64C 1/061* (2013.01); *B64C 1/064* (2013.01);
(Continued)

(58) Field of Classification Search
CPC ........... B64C 1/12; B64C 1/061; B64C 1/064; B29C 45/0025; B29C 2105/12
See application file for complete search history.

(56) References Cited

U.S. PATENT DOCUMENTS 5,527,155 A * 6/1996 Chen ...................... B29C 44/04
416/226
7,802,413 B2 * 9/2010 Wood .................... B64C 1/1492
244/129.3
(Continued)

FOREIGN PATENT DOCUMENTS

DE    10 2010 063076 A1    6/2012

OTHER PUBLICATIONS

Written Opinion and International Search Report PCT/EP2014/063088 (dated Dec. 15, 2014).
(Continued)

*Primary Examiner* — Christopher P Ellis
(74) *Attorney, Agent, or Firm* — Lerner, David, Littenberg, Krumholz & Mentlik, LLP

(57) ABSTRACT

An aircraft including a primary-structure connection element for attaching the aircraft skin to the primary structure of the aircraft is provided. The primary-structure connection element is designed as a shearweb, a clip and/or as a frame stabilization element or as a rib stabilization element and is manufactured from a fiber-reinforced thermoplastic material with the use of injection molding. Likewise, an injection molding method for the manufacture of such a primary-structure connection element is provided, in which method the fiber-reinforced thermoplastic material is injected in its melted state into an injection molding device. The manufactured shearweb etc. is removed from the injection molding device. In this method, in particular, chopped carbon fibers and/or glass fibers in combination with polyphenylene sulfide (PPS) and/or polyetherether ketone (PEEK) are used, for example also in pellet form.

12 Claims, 4 Drawing Sheets

(51) Int. Cl.
*B64C 1/06* (2006.01)
*B29L 31/30* (2006.01)
*B29K 71/00* (2006.01)
*B29K 81/00* (2006.01)
*B29K 105/12* (2006.01)

(52) U.S. Cl.
CPC ...... *B29K 2071/00* (2013.01); *B29K 2081/04* (2013.01); *B29K 2105/12* (2013.01); *B29L 2031/3076* (2013.01); *Y02T 50/43* (2013.01)

(56) References Cited

U.S. PATENT DOCUMENTS

| | | | | |
|---|---|---|---|---|
| 8,277,933 | B1* | 10/2012 | Vaidya | B29C 70/46 428/292.1 |
| 8,846,189 | B1* | 9/2014 | Vaidya | B29C 43/006 244/120 |
| 9,309,913 | B2* | 4/2016 | Klaukien | B64C 1/406 |
| 2007/0011970 | A1* | 1/2007 | Hethcock | B64C 1/068 52/481.1 |
| 2009/0232647 | A1* | 9/2009 | Henkle | B29C 45/0005 415/200 |
| 2010/0272954 | A1 | 10/2010 | Roming et al. | |
| 2015/0148485 | A1* | 5/2015 | Yohannes | C08J 5/06 524/847 |
| 2015/0247025 | A1* | 9/2015 | Ichikawa | C08J 5/042 428/220 |
| 2016/0368187 | A1* | 12/2016 | Schneebauer | B29C 70/467 |
| 2016/0368585 | A1* | 12/2016 | Farouz-Fouquet | B64C 1/064 |
| 2018/0022438 | A1* | 1/2018 | Crespo Pena | B64C 3/24 |

OTHER PUBLICATIONS

Technical Spotlight: "Peek Parts Reduce Weight without Sacrificing Performance", Advanced Materials & Processes, May 2013 (May 2013), pp. 35-37, Retrieved from the Internet: URL:http://www.asminternational.org/documents/<http://www.asminternational.org/documents/10192/6015231/>10192/6015231/ <http://www.asminternational.org/documents/10192/6015231/> amp17105p35.pdf/ae3ece15-96f1-4ad8-ae9f-64c63b9f8dc1 [retrieved on Oct. 30, 2014].

Ensinger: "High-performance plastics for Aviation and Aerospace", Jan. 2007 (Jan. 2007), pp. 1-8, Retrieved from the Internet: URL:http://ww <http://www.sdplastics.com/ensinger/aerodef.pdf>w.sdplastics.com/ensinger/aerodef.pdf <http://www.sdplastics.com/ensinger/aerodef.pdf>[retrieved on Oct. 30, 2014].

"High-performance Plastics for Aviation and Aerospace", Waybackmachine, May 14, 2013 (May 14, 2013), Retrieved from the Internet: URL:http://web.archive.org/web/*/http://www.sdplastics.com/ensinger/ <http://www.sdplastics.com/ensinger/>aerodef.pdf [retrieved on Dec. 2, 2014].

Victrex: "Victrex Peek 90HMF40 Polymer Passes Airbus Qualification for Leightweight Aerospace Components", Victrex Peek Aerospace, Jun. 25, 2013 (Jun. 25, 2013), pp. 1-3, Retrieved from the Internet: URL:http://www.victrex.com/en/news/2013/06/951 <http://www.victrex.com/en/news/2013/06/951>[retrieved on Nov. 27, 2014].

Victrex: "Victrex Peek 90HMF40", Jul. 2012 (Jul. 2012), pp. 1-2, Retrieved from the Internet: URL:http://www.victrex.com/de/docs/datasheets-docs/ <http://www.victrex.com/de/docs/datasheets-docs/>Victrex_TOS_90HMF40.pdf [retrieved on Nov. 27, 2014].

Victrex Polymer Solutions: "For Lighter, Leaner Aerospace Solutions", Victrex High Performance Peek Polymers, Sep. 2013 (Sep. 2013), Retrieved from the Internet: URL:http://www.aircraftinteriorsexpo-us.com/_novadocuments/55616? <http://www.aircraftinteriorsexpo-us.com/_novadocuments/55616>V=635393909682670000 [retrieved on Nov. 27, 2014].

* cited by examiner

INJECTION MOLDING METHOD FOR THE MANUFACTURE OF A PRIMARY-STRUCTURE CONNECTION ELEMENT

CROSS-REFERENCE TO RELATED APPLICATIONS

This application is a continuation of International Application No. PCT/EP2014/063088 filed Jun. 23, 2014, published in Jan. 22, 2015, which claims priority from German Patent Application No. 10 2013 107 551.7 filed Jul. 16, 2013, all of which are incorporated herein by reference.

FIELD OF THE INVENTION

The invention relates to a connection means for attaching an aircraft skin to an aircraft, in particular to an aircraft reinforcement element, for example to a frame element or to a rib. In particular, the invention relates to an injection molding method for the manufacture of a primary-structure connection element, to a primary-structure connection element for attaching an aircraft skin to a primary aircraft-structure, and to an aircraft.

BACKGROUND OF THE INVENTION

The primary structure of an aircraft in the main fuselage region comprises several frame elements and stringers. In contrast to this, ribs are, for example, used in wings, vertical stabilizers and horizontal stabilizers in the primary structure. By means of so-called shearwebs, clips (short shearwebs) and frame stabilization elements (cleats or stabilos) the aircraft skin is attached to the frame elements. In the case of ribs, rib stabilization elements are used instead of frame stabilization elements. In combination with shearwebs or clips, rib stabilization elements are used in order to affix the aircraft skin, for example in the region of a wing, to the ribs. In other words, a rib stabilization element is a cleat that is attached to a rib. In this arrangement, commonly a rivet connection is used between the above-mentioned elements. However, in the context of the present invention it is possible, also or alternatively, to use bolts, for example so-called hi-lites and lock bolts.

The shearwebs, clips, frame stabilization elements and rib stabilization elements presently used are made of a material comprising carbon fibers. Such materials have hitherto usually been processed with the following manufacturing method to form clips or cleats. In this method a joined multi-layer raw material is used that comprises, for example, fourteen (14) woven and crossed layers. Subsequently a plate of a desired size is pressed from this multi-layer raw material in order to subsequently heat the plate-shaped multi-layer material and in its solid phase make it conform to the contour of a mold. Subsequently, the protrusions and edges are sawn off so that a precise component shape is obtained. This method is associated with a disadvantage in that it is necessary to seal the edges so that no fibers on the edges are left dry. In this process the regions that do not contain resin are to be sealed in order to reduce corrosion. In the manufacture of clips and cleats, i.e. of shearwebs and frame stabilization elements or of rib stabilization elements, according to the method described above, in terms of the radii arising on the component manufactured, one depends on the given shape of the mold. Furthermore, this manufacturing method has shown to be very labor-intensive and expensive, because it requires several intermediate steps, and because, in order to prevent galvanic corrosion, the edges of the component need to be sealed in a separate process step. In particular in the case of shearwebs, frame stabilization elements and rib stabilization elements, of which between 3,000 and more than 10,000 pieces per aircraft are installed, this involves enormous labor costs in the manufacture of an aircraft.

BRIEF SUMMARY OF THE INVENTION

There may be a need to make it possible to achieve the improved provision of a primary structure of an aircraft, in particular in terms of labor input and costs.

The exemplary embodiments described above and below equally relate to the injection molding method, to the primary-structure connection element and to the aircraft. In other words, features which are described below in relation to the primary-structure connection element can also be implemented in the aircraft and can be considered as characteristics or as a part or aspect of the method, and vice versa.

In the context of the instant disclosure, the term "primary-structure connection element" refers, in particular, to a shearweb, to a frame stabilization element, to a clip or to a rib stabilization element as exemplary embodiments.

In the context of the present disclosure, the term "shearweb" refers to a frame-element shear introduction device. This corresponds to the usual understanding of the average person skilled in the art. Said term refers to a device for affixation to a frame element of an aircraft. In this context a shearweb connects a frame element to part of the skin of the aircraft; it reaches across several stringers.

Furthermore, in the context of the present disclosure, the term "clip" refers to a type of short shearweb, to the extent that a clip only reaches from a first stringer foot to a second stringer foot. For example, FIG. 6 shows a shearweb 605, while FIG. 4 shows a clip 401 that in its installed position is only arranged between two stringers.

Furthermore, in the context of the present disclosure, the term "frame stabilization element" refers to a cleat or stabilo. To the average person skilled in the art, and according to the definitions and terminologies used in this document, the term "rib stabilization element" refers to a stabilization element, similar to a frame stabilization element, that is used on a rib, in other words, for example, in the region of a wing, of a vertical stabilizer or of a horizontal stabilizer. The rib stabilization element supports and stabilizes a rib of the aircraft.

It should be mentioned that hereinafter the embodiments of the invention, in terms of the primary-structure connection element, are varyingly described as shearwebs, clips, frame stabilization elements and/or rib stabilization elements. In this context the individual description in each case also applies to the other exemplary embodiments of the generic feature of primary-structure connection elements.

According to an exemplary embodiment of the invention, an injection molding method for the manufacture of a primary-structure connection element is provided. The method comprises the steps of providing a fiber-reinforced thermoplastic composition, melting the fiber-reinforced thermoplastic composition, and injecting the fiber-reinforced thermoplastic composition into an injection molding device. In this arrangement the injection molding device comprises an injection mold for the manufacture of the primary-structure connection element. Furthermore, the method involves the step of removing the produced primary-structure connection element from the injection molding device.

By means of this exemplary embodiment a novel process of manufacturing a primary-structure connection element, for example a shearweb and/or a frame stabilization element, is provided, in which process a fiber-reinforced thermoplastic material is used by means of injection molding. As will be described in detail below, the method can also concurrently, in other words in one pass of the method, produce a shearweb or a clip and a frame stabilization element, or a shearweb or a clip and a rib stabilization element. It is thus possible in an integral manner to produce a component that serves the function of a clip and of a cleat, as shown, for example, in FIGS. 4 and 5.

In this manner it is possible to produce a lightweight primary-structure connection element at low costs, quickly and in one production process. In particular a fiber-reinforced thermoplastic composition with a high modulus of elasticity is suitable for this. Further details and aspects relating to the modulus of elasticity of the fibers used and of the shearweb, clip, frame stabilization element produced and/or of the rib stabilization element produced, are explained below.

In particular, the fiber-reinforced thermoplastic material can be provided in pellet form and can be transported to a heating element by means of a transport device. The composition can be melted and compressed so that it is subsequently injected at the required pressure into the cavity that is formed by the injection mold. For example 1,000 bar can be used as an injection pressure. However, other values, above and below 1,000 bar, for example 2,000 bar, can also be used. The injection mold can be preheated in order to provide an improved or optimum temperature to ensure a rapid crystallization process. As soon as the matrix has made a transition to the solid phase, the primary-structure connection element can be removed from the injection molding device. Since in its final form the component, i.e. the primary-structure connection element, is covered by the thermoplastic resin, no processing, cutting or sealing of the edges of the produced component is necessary. On completion of the process, in each case a resin is present on the surfaces of the molded primary-structure connection element, and consequently no fiber is left dry.

The fiber-reinforced thermoplastic composition in this and in any other exemplary embodiment can be provided by a thermoplastic matrix, which is a resin, and in addition by chopped fibers, for example carbon fibers and/or glass fibers. Various mixing grades are possible.

In other words, by means of this method a thermoplastic composition which comprises fibrous material is provided, melted and injected into an injection molding device. In this manner it is possible to manufacture a primary-structure connection element (shearweb, clip and/or a frame stabilization element and/or a rib stabilization element) both economically and quickly and also with the required mechanical properties, in particular in terms of its modulus of elasticity. For example, the primary-structure connection element that has been produced by means of the injection molding method according to the invention can have a modulus of elasticity of a value range of $E \geq 30$ GPa, $E \geq 35$ GPa, or $G \geq 40$ GPa. However, other values that differ from these are also possible, if desired. Furthermore, the fiber-reinforced thermoplastic composition can, for example, comprise chopped carbon fibers with a modulus of elasticity that ranges in value from $E \geq 250$ GPa, $E \geq 300$ or $E \geq 350$ GPa. For example polypheylene sulfide (PPS) and/or polyetherether ketone (PEEK) can be mentioned as preferred thermoplastic materials, but other materials, either in addition or as an alternative, can also be contained in the composition.

Depending on the field of application of the primary-structure connection element in the aircraft, it may be necessary for such an element to provide a rigidity/stiffness of between 30 GPa and 40 GPa, 40 GPa and 50 GPa or greater than 50 GPa. This requirement can be met by means of the injection molding method presented herein.

The injection molding method according to the present invention features a shortened production period when compared to prior art and can produce a primary-structure connection element within 1 to 5 minutes per item. Depending on the injection molding device in use, the period of time can also be shorter. Furthermore, it is possible to significantly reduce the cost of materials and materials wastage. Overall, according to experience and calculations of the inventors, a reduction in the unit price of up to 50% for primary-structure connection elements, i. e. for shearwebs and/or frame stabilization elements and/or the rib stabilization element can be achieved. Likewise, the injection molding method for the manufacture of a primary-structure connection element provides the option and potential for optimization in terms of the design and the form of these components, and allows the integration of additional stabilization elements.

According to a further exemplary embodiment of the invention, the fiber-reinforced thermoplastic composition comprises carbon fibers and/or glass fibers.

In particular, chopped carbon fibers and/or chopped glass fibers can be used. For example, carbon fibers and/or glass fibers can be used with polyphenylene sulfide (PPS) and/or polyetherether ketone (PEEK). PPS is a high-temperature-resistant thermoplastic material of the general formula $(SC_6H_4)n$. Likewise, PEEK is a high-temperature-resistant thermoplastic material that forms part of the group of substances of polyarylether ketones.

Other elements from this group of substances in combination with carbon fibers and/or glass fibers can also be used. In the above-mentioned examples it is advantageously possible to provide the fiber-reinforced thermoplastic composition in pellet form, which allows convenient implementation of the injection molding method.

According to a further exemplary embodiment of the invention, the composition is thus provided in pellet form, and the method further comprises the step of transporting fiber-reinforced thermoplastic pellets to a melting device for implementing the melting process.

According to a further exemplary embodiment of the invention, the following ratio applies to the largest fibers of the carbon fibers and/or to the largest fibers of the glass fibers in terms of the length L of the fibers and in terms of the diameter d of the fibers: $L/d \geq 10$, $L/d \geq 50$, $L/d \geq 75$, or $L/d \geq 100$.

In other words, a composition is used in which the longest carbon fibers and/or glass fibers meet the above-mentioned criterion.

According to a further exemplary embodiment the average length of the fibers is between 0.1 mm and 5 mm. For example 0.7 mm can be preferred. This can be an average value around which the lengths of the individual fibers in the composition are statistically distributed. According to a further exemplary embodiment an average value of the fibers does not exceed the maximum value of 1 mm, 2 mm, 3 mm, 4 mm, or 5 mm.

In other words, chopped fibers, in particular chopped carbon fibers and/or glass fibers, are used whose length makes possible a compact provision of the composition.

According to a further exemplary embodiment of the invention, the composition comprises carbon fibers with a modulus of elasticity E of a value of E≥250 GPa, E≥300 or E≥350 GPa and/or wherein the composition comprises glass fibers with a modulus of elasticity E of a value of E≥70 GPa, E≥85 GPa or E≥95 GPa.

Carbon fibers of such a high modulus of elasticity can be used in the injection molding of particularly rigid primary-structure connection elements that can absorb the loads usually experienced in the primary structure in an aircraft. On the other hand, glass fibers are cheaper and can, depending on requirements, be used as a single fiber component of the composition, or can be admixed to the carbon fibers. It should be mentioned that in terms of the length of the fibers these exemplary embodiments can readily be combined, in particular with the exemplary embodiment described above and below.

According to a further exemplary embodiment of the invention, a first fiber-reinforced thermoplastic material is used, and a second material, which differs from the above material, is used in the injection molding method.

According to a further exemplary embodiment of the invention, the method comprises the step of inserting a reinforcement element in the injection molding device and the step of connecting/building the reinforcement element with the injected composition in the injection molding device. In other words, in this way the melted mass of the composition and the inserted reinforcement element are connected/contacted.

The choice of injection molding technique for the manufacture of the aircraft-fuselage attachment means, i.e. of the primary-structure connection element, makes it possible to achieve particular reinforcement in certain regions of the manufactured component, and consequently other regions of the component can, for example, be designed so as to be thinner or shorter. Thus in this manner a combination of injection molding production of the aircraft-fuselage attachment means or wing attachment means or attachment means of the rear fuselage (tail plane), vertical stabilizer and horizontal stabilizer and reinforcement is implemented. Further details and additional or alternative aspects to this are described in the context of FIG. 5. In this arrangement the primary-structure connection element, e.g. the shearweb and/or the frame stabilization element, together with a reinforcement element can be combined, with the use of injection molding technology, to form a single component. Further advantages of this exemplary embodiment are set out and elucidated below in the context of FIG. 5.

According to a further exemplary embodiment of the invention, the composition comprises polyphenylene sulfide (PPS) and/or polyetherether ketone (PEEK).

According to a further exemplary embodiment of the invention, the composition comprises fibers which on average have a length of between 0.1 mm and 5 mm.

As an example, below, the material victrex peek 90hmf40 can be mentioned. However, the use of materials other than the aforesaid is possible without leaving the scope of protection of this exemplary embodiment. It is also possible to use chopped glass fibers, for example in combination with polyphenylene sulfide (PPS), polyetherether ketone (PEEK) or other thermoplastics, or thermoplastic resins.

According to a further exemplary embodiment of the invention, a primary-structure connection element for attaching an aircraft skin to a primary aircraft-structure of an aircraft is provided. In this embodiment the primary-structure connection element is designed as a shearweb, clip, frame stabilization element and/or as a rib stabilization element, and the primary-structure connection element is manufactured from a fiber-reinforced thermoplastic composition with the use of injection molding.

The primary-structure connection elements mentioned in this documents are also usable in other aircraft or spacecraft. In particular in helicopters, satellites or other aircraft the primary-structure connection elements according to the invention can be used. According to a further exemplary embodiment of the invention, such an aircraft is provided.

Of course, this exemplary embodiment, i.e. the primary-structure connection element, can be manufactured according to an injection molding method of the exemplary embodiments described above and below. The primary-structure connection element manufactured in this manner does not comprise any post-sealing that could disadvantageously peel off and that is associated with additional weight and added expenditure. For this reason a primary-structure connection element manufactured with the use of injection molding technology prevents the sealing from having a too short life time, thus preventing the danger of corrosion. The primary-structure connection element, which has been manufactured using an injection molding method, leaves the mould as a single-piece finished component and does not comprise any dry fibers, because all the outer fibers are in contact with resin during the injection molding process. This has proven to be a significant advantage of the present invention when compared to the state of the art.

The primary-structure connection element can also be considered to be an aircraft-fuselage attachment means that is suitable and designed for attachment of the aircraft skin to a frame element/a rib of the aircraft frame or for ribs in the wing (for example on the "tankhole or manhole"). In particular, it will be clear to the average person skilled in the art that typically occurring loads must and can be absorbed by such a primary-structure connection element. Further aspects and additional details on this will be described in more detail below with reference to several exemplary embodiments.

According to a further exemplary embodiment of the invention, the primary-structure connection element is of an essentially triangular or a triangular construction. According to a further exemplary embodiment of the invention, the primary-structure connection element is of an essentially trapezoidal or a trapezoidal construction.

According to a further exemplary embodiment of the invention, the primary-structure connection element comprises a first flange for establishing a connection to the aircraft skin, and comprises a second flange for establishing a connection to the aircraft skin.

In a particular embodiment the two flanges are (essentially) situated in one plane, for example the flanges 501 and 502 in FIG. 5. With the use of the injection molding method such a component can comprise two different flanges for attachment to the aircraft skin. This has not been possible with hitherto-known manufacturing methods, in particular it has not been possible in relation to an integrated component. A specific exemplary embodiment of the aforesaid is shown and described in FIG. 5.

According to a further exemplary embodiment of the invention, the primary-structure connection element comprises a first flange for establishing a connection to the aircraft skin, and comprises a second flange for establishing a connection to the frame element.

According to the method of the state of the art it is not possible to manufacture a primary-structure connection element with two flanges, because in that method the component is folded from one plate. Furthermore, it is not possible to implement differences in the wall thickness of the component. However, since the present invention makes it possible to accomplish both of the above, it is particularly valuable, in particular for manufacturing primary-structure connection elements comprising two, three, four or more flanges. As an alternative or in combination it is also possible with the use of the present invention to provide a primary-structure connection element with differences in the wall thickness.

According to a further exemplary embodiment of the invention, the primary-structure connection element comprises a modulus of elasticity E that ranges in value from 30 GPa≤E≤60 GPa.

According to a further exemplary embodiment of the invention, the primary-structure connection element comprises at least a first, a second, a third and a fourth flange.

According to a further exemplary embodiment of the invention, an aircraft is stated that comprises a primary aircraft-structure with at least one frame element and at least one rib and an aircraft skin. Furthermore, a shearweb or a clip, a frame stabilization element and a rib stabilization element are provided, wherein a first part of the aircraft skin is attached to the frame element of the primary aircraft-structure, and a second part of the aircraft skin is attached to the rib of the primary aircraft-structure. Furthermore, by means of the shearweb or the clip and the frame stabilization element the first part of the aircraft skin is attached to the frame element of the primary aircraft-structure, and by means of the rib stabilization element the second part of the aircraft skin is attached to the rib of the primary aircraft-structure. At least one element from the group comprising the shearweb, the clip, the frame stabilization element and the rib stabilization element is manufactured from a fiber-reinforced thermoplastic composition by means of injection molding.

In the last-mentioned exemplary embodiment, relating to an aircraft, too, the shearweb and/or the frame stabilization element, the cleat and/or the rib stabilization element can be manufactured from a composition that comprises thermoplastic carbon fibers, wherein in the composition the fibers can be present in chopped form. In particular, a length/maximum length of the fibers of 0.1 mm to 5 mm is possible. Other lengths of the fibers, which lengths differ from the above, are also possible. In particular, it is possible to use carbon fibers and/or glass fibers with polyphenylene sulfide (PPS) and/or polyetherether ketone (PEEK) as a fiber-reinforced thermoplastic composition. For example, hereinafter the material victrex peek 90hmf40 can be mentioned. However, the use of other materials that differ from the above is possible.

Further features, advantages and application options of the invention are disclosed in the following description of the exemplary embodiments. Identical or similar elements in the figures can have identical or similar reference characters.

The illustrations in the figures are schematic and not to scale.

DETAILED DESCRIPTION OF EXEMPLARY EMBODIMENTS

Figure 1:
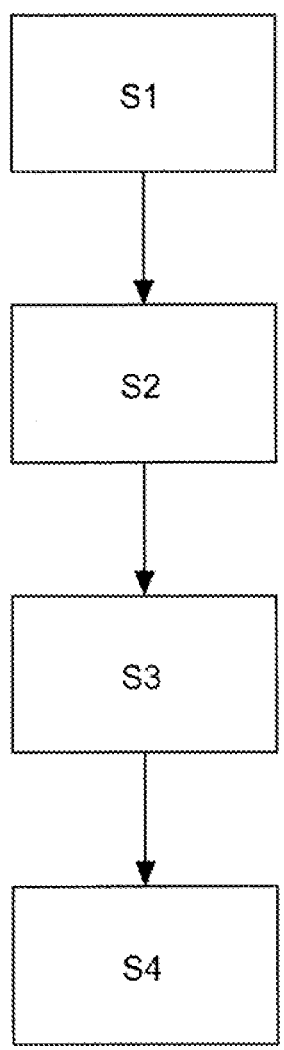
FIG. 1 shows a flow chart of an injection molding method for the manufacture of a shearweb, clip, frame stabilization element and/or of a rib stabilization element according to an exemplary embodiment of the invention.

By means of a flow chart that shows steps S1, S2, S3 and S4, FIG. 1 represents an injection molding method according to an exemplary embodiment of the invention. The injection molding method is used for the manufacture of a primary-structure connection element (a shearweb, clip and/or a rib stabilization element or frame stabilization element) wherein a fiber-reinforced thermoplastic composition serves as an injection molding medium. This composition is provided in step S1. In step S1, for example, the fiber-reinforced thermoplastic composition victrex peek 90hmf40 can be used. However, these are merely exemplary embodiments, and the use of other materials is also possible, either additionally or alternatively.

Figure 4:
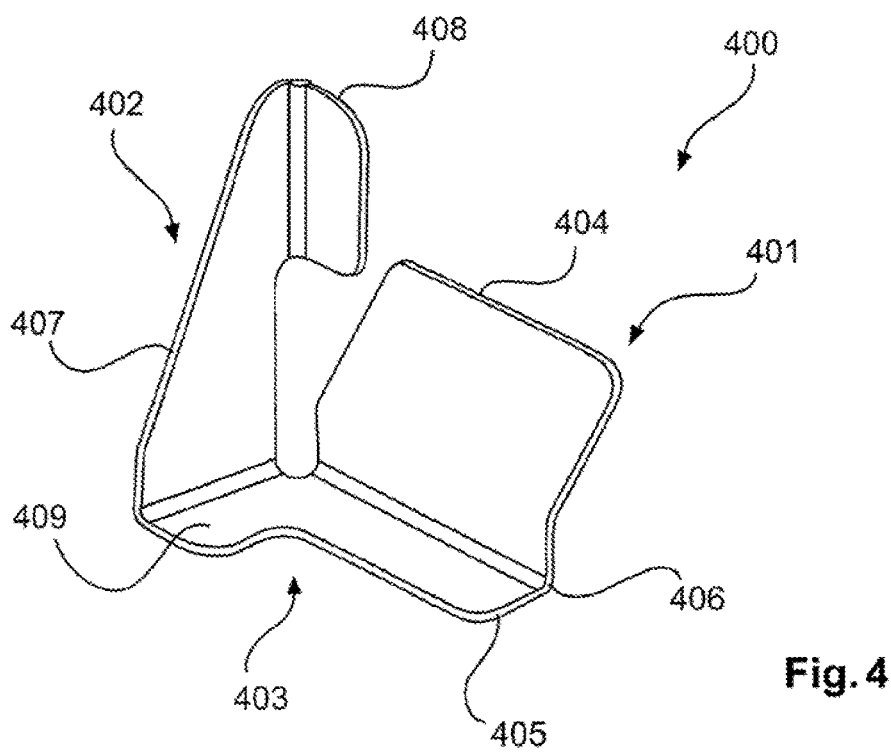
FIG. 4 is a diagrammatic view of a primary-structure connection element which as an integrated solution comprises both a clip and a frame stabilization element, or a clip and a rib stabilization element according to an exemplary embodiment of the invention.
Figure 5:
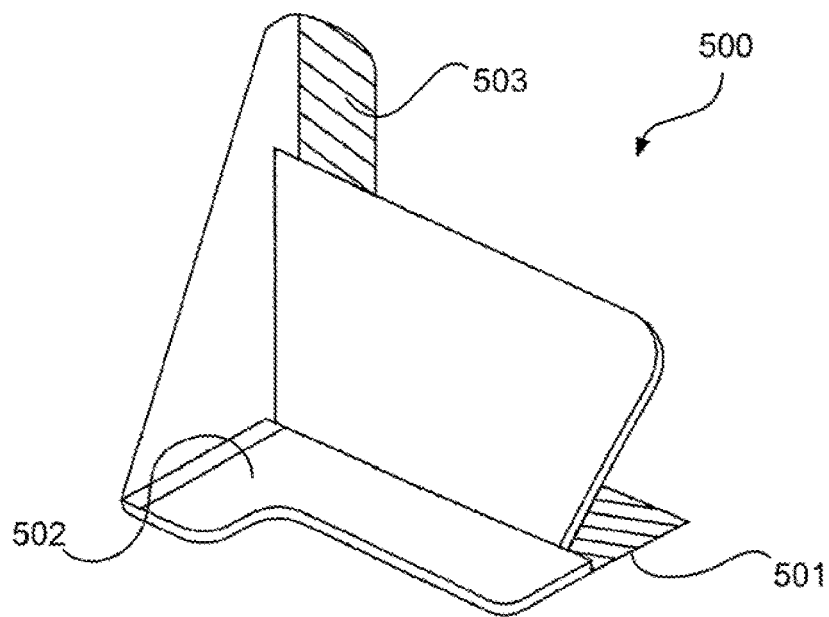
FIG. 5 is a diagrammatic view of a primary-structure connection element which as an integrated solution additionally comprises reinforcement elements according to an exemplary embodiment of the invention.

Furthermore, this composition is melted in step S2 so that in step S3 the melted composition can be injected into an injection molding device with an injection mold for the manufacture of the primary-structure connection element. Subsequently, in step S4 the manufactured primary-structure connection element can be removed or ejected so that a further cycle of the injection molding method can be carried out. It should be mentioned that with the implementation of the injection molding method according to FIG. 1 a shearweb, clip or a frame stabilization element or a rib stabilization element can be manufactured. For this purpose a corresponding injection mold is to be used. However, if desired, it is also possible to injection-mold an integrated variant that comprises both a shearweb and a frame stabilization element. This single-piece component is to be considered to be a particular embodiment of the invention, wherein two exemplary embodiments are shown in FIGS. 4 and 5. In further developed exemplary embodiments the injection molding method shown in FIG. 1 can be supplemented by additional steps.

The following steps and parameters of the molding method can be combined with the exemplary embodiments mentioned above and below. By means of a screw-type pump, plastic granulate, i.e. the fiber-reinforced thermoplastic composition, is conveyed to a container. By means of heating elements the plastic granulate is melted. Furthermore, the melted plastic granulate is injected into the molding device by means of the screw. In this process the increase in pressure can be up to 2000 bar. As a result of the cold matrix the molted plastic granulate hardens and makes a transition to the solid phase. After the matrix has been opened, the molded primary-structure connection element can be removed. The temperature depends on the matrix used. The temperature can be 250° C. to 400° C., or it can be lower than 250° C. or higher than 400° C.

In particular, the above-described steps of inserting a reinforcement element in the injection molding device and of connecting the reinforcement element with the injected composition in the injection molding device can form part of a further embodiment. Details relating to various reinforcement elements will be further elucidated below.

Figure 2:
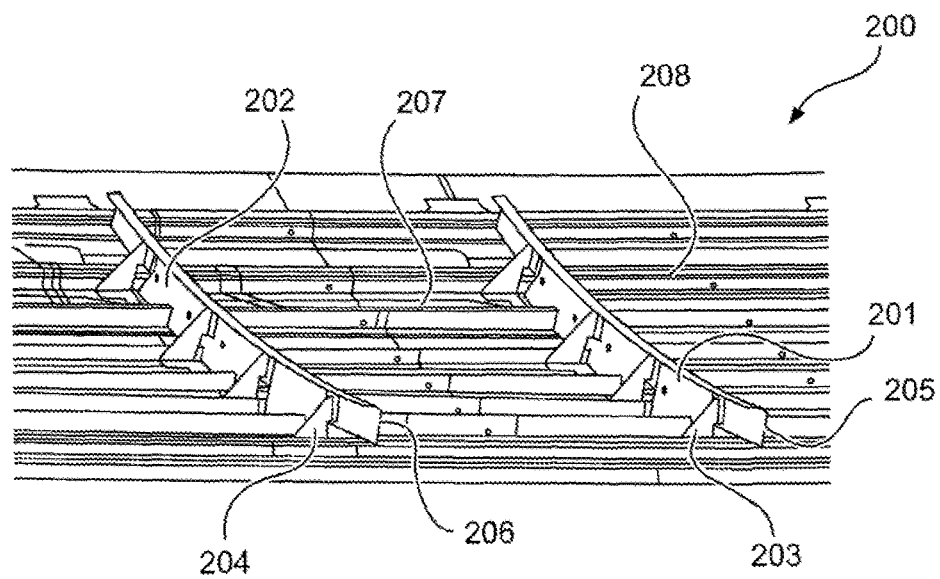
FIG. 2 shows a section from a primary aircraft-structure with a plurality of primary-structure connection elements according to an exemplary embodiment of the invention.

FIG. 2 is a schematic view of part of a primary aircraft-structure 200 in the main fuselage region of an aircraft, with the diagram showing several frame elements 205 and 206. Such an aircraft is, for example, shown in FIG. 7. Likewise, the diagram shows several stringers 207 and 208 that are rigidly connected to the two frame elements shown. Likewise, as a primary-structure connection element, a plurality of shearwebs and clips 201 and 202 are shown that are attached to the respective frame element by way of rivets and/or bolts. In this embodiment the shearwebs 201 and 202 have been manufactured by means of injection molding from a fiber-reinforced thermoplastic composition. Likewise, FIG. 2 shows frame stabilization elements (cleats) 203, 204 that likewise comprise a fiber-reinforced thermoplastic material and that have been manufactured by means of injection molding, as described in this document. These primary-structure connection elements 201-204 therefore do not comprise any post-sealing that could disadvantageously peel off and that is associated with additional weight. Likewise, the frame stabilization elements 203 and 204 shown in FIG. 2 comprise chopped carbon fibers of an average length of between 0.1 mm and 5 mm. For other applications it is also possible to use shorter and/or longer fibers without leaving the scope of protection of the invention. This clearly sets the frame stabilization elements 203 and 204 apart from conventionally manufactured frame stabilization elements. The same applies to the shearwebs and clips 201, 202. The longitudinally extending stringers 208 are connected to the frame elements 205 and 206 both by way of the shearwebs and clips 201, 202 and by way of the frame stabilization elements 203 and 204. Likewise, the aircraft skin of the associated aircraft is connected to the primary structure 200 by way of the elements 201, 202, 203 and 204. The aircraft skin is not shown in FIG. 2. In particular, rivet connections and/or bolts are used for this purpose.

Figure 3:
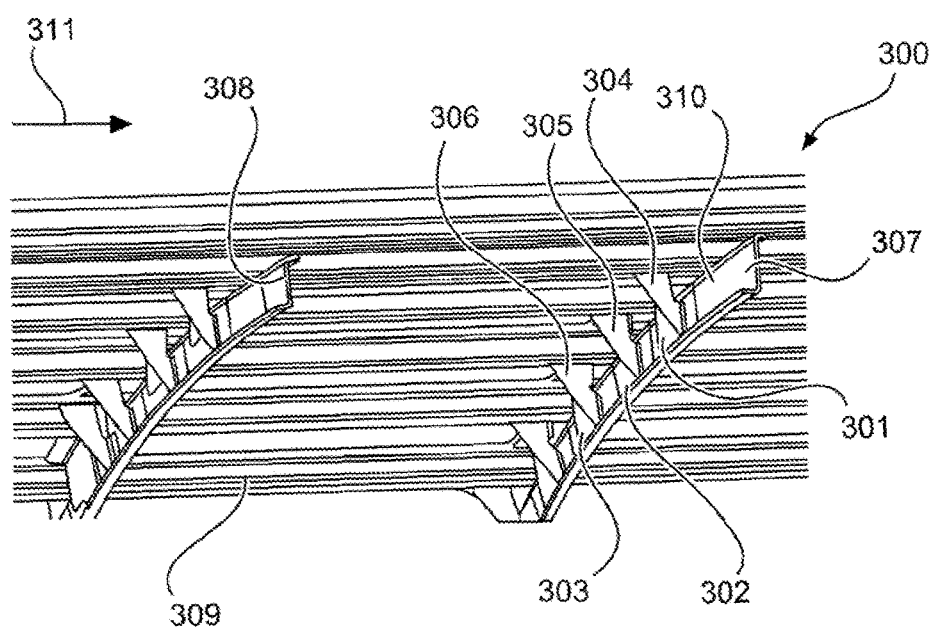
FIG. 3 shows a primary aircraft-structure with a plurality of shearwebs and frame stabilization elements according to a further exemplary embodiment of the invention.

According to a further exemplary embodiment of the invention, FIG. 3 shows a plurality of primary-structure connection elements that are arranged in a primary aircraft-structure 300. FIG. 3 shows two frame elements 307 and 308 in the shape of a circular arc. FIG. 3 also shows several longitudinally extending stringers 309. The diagram shows several shearwebs and clips 301, 302 and 303 as well as several frame stabilization elements 304, 305 and 306. Each frame stabilization element 304, 305 and 306 essentially extends perpendicularly away from the frame element 307, in other words so as to be perpendicular to the direction extending in the circular arc shape. In contrast to this, the shearwebs 301, 302 and 303 extend so as to be essentially parallel to the plane 310 of the frame element 307, which plane 310 extends so as to be perpendicular to the longitudinal direction of the aircraft. In FIG. 3 the longitudinal direction of the aircraft is indicated by the arrow 311. In this embodiment the clips and cleats can be connected to the aircraft skin with the use of rivet connections or by means of bolts (hi-lites or lock bolts).

According to a further exemplary embodiment of the invention, analogously to FIGS. 2 and 3, a primary structure is stated that uses ribs, in other words, for example, in wings, vertical stabilizers or horizontal stabilizers. Furthermore, the invention relates to the rear fuselage region in which integral frame elements are used. In this region shearwebs 201, 202 and rib stabilization elements 203 and 204 are used on the ribs of the aircraft, which shearwebs 201, 202 and rib stabilization elements 203 and 204 have been manufactured by means of injection molding and comprise a fiber-reinforced thermoplastic composition. Since such ribs are known to the average person skilled in the art there is no need to provide a more detailed description.

According to a further exemplary embodiment of the invention, FIG. 4 shows a primary-structure connection element 400 that as an integrated solution has both a clip and a frame stabilization element, or a clip and a rib stabilization element. The element 400 comprises both a first component region 401 that is designed as a clip and that can be used as such, and comprises a second component region 402 that is designed as a frame stabilization element and that can be used as such. Between these two regions 401 and 402 there is a planar transition region 403 so that a joint flange for the clip 401 and the frame stabilization element 402 is formed. This integral solution, which combines a shearweb and a frame stabilization element in one component, has been made with the use of the injection molding method according to the invention. The primary-structure connection element shown in FIG. 4 comprises a fiber-reinforced thermoplastic material; it has a rigidity, i.e. a modulus of elasticity, that exceeds 40 GPa. In this exemplary embodiment chopped carbon fibers were used together with PPS as the thermoplastic composition. In particular, the following materials have been shown to be suitable for the injection molding method according to the invention for the manufacture of aircraft shearwebs and aircraft frame stabilization elements. Chopped fibers for example comprising a length/maximum length of 0.1 mm to 5 mm are suitable. Other lengths of fibers, which lengths differ from the above, are also possible. In particular, such long carbon fibers can be used with polyphenylene sulfide (PPS) and/or polyetheretherketone (PEEK) as a fiber-reinforced thermoplastic composition. For example, victrex peek 90hmf40 can be mentioned. However, the use of other materials is also possible.

The primary-structure connection element 400 comprises a first planar region 404 that is designed to be attached to an aircraft frame element so as to be parallel to the main direction of extension of said aircraft frame element. Such attachment is, for example, shown in FIG. 6. A planar region 405, which extends so as to be essentially perpendicular to the above, as a first flange is designed, in its installed position on the primary aircraft-structure, to be attached to a stringer, for example to the stringer 606 in FIG. 6. Furthermore, the component region 402 comprises an essentially triangular region 407 that serves as a frame stabilization element. A first upper region 408, which extends so as to be essentially perpendicular to said triangular region 407, extends in perpendicular direction to the plane of the region 407. The first upper region can be considered to be a flange for affixation to an aircraft frame element/to an aircraft rib. As is shown, for example, in FIG. 6, with the aforesaid the component 400 can also be attached in the region 408 to a frame element 601. Furthermore, this region 402 extends in the lower part almost perpendicularly into a planar region 409 by means of which the frame stabilization element 402 can be attached to a stringer, for example to stringer 606 in FIG. 6. A clip-cleat combination 400 is commonly referred to as a clip by the average person skilled in the art.

According to a further exemplary embodiment of the invention, FIG. 5 shows a primary-structure connection element 500 which analogously to that shown in FIG. 4 comprises both a region that can be used as a clip and a region that can be used as a frame stabilization element/rib stabilization element. In terms of the disclosure of the above, reference is made to FIG. 4. In addition to FIG. 4, the exemplary embodiment of FIG. 5 comprises a reinforcement element 501. It should be noted that the reinforcement element described below can be used on a clip or shearweb, or on a frame stabilization element. From these variants the average person skilled in the art understands that the primary-structure connection element that can be manufactured with the use of the injection molding method can be specifically modified by means of different reinforcement elements and/or different wall thicknesses.

The element 501 represents an additional, second, flange that can simply and economically be implemented on the primary-structure connection element 500 by means of the injection molding method of the present invention. As a result of the possibility of carrying out the injection molding method relatively quickly, it becomes possible in this manner to integrate relatively complex form supplements of the primary-structure connection element. Likewise it is possible, in addition or as a supplement, to insert a reinforcement element into the injection molding device so that correspondingly reinforced riveting positions are provided in the resulting component 500. Likewise, the injection molding technology used makes it possible to achieve local variations in thickness, which is, for example, shown in FIG. 5 as an increase in the wall thickness in the region 503. Likewise, because of the use of injection molding technology, a decrease in the wall thickness can be implemented very easily by the user. With the use of prior art, the gap between 404 and 408 in FIG. 4 can presently not be avoided. In contrast to this, the injection molding method according to the invention can close this gap if desired, as is shown in FIG. 5. In that diagram, element 506 is connected. This clearly increases the stability of the clip-cleat combination, as is shown in FIG. 5. The same applies to the flange 501.

Figure 6:
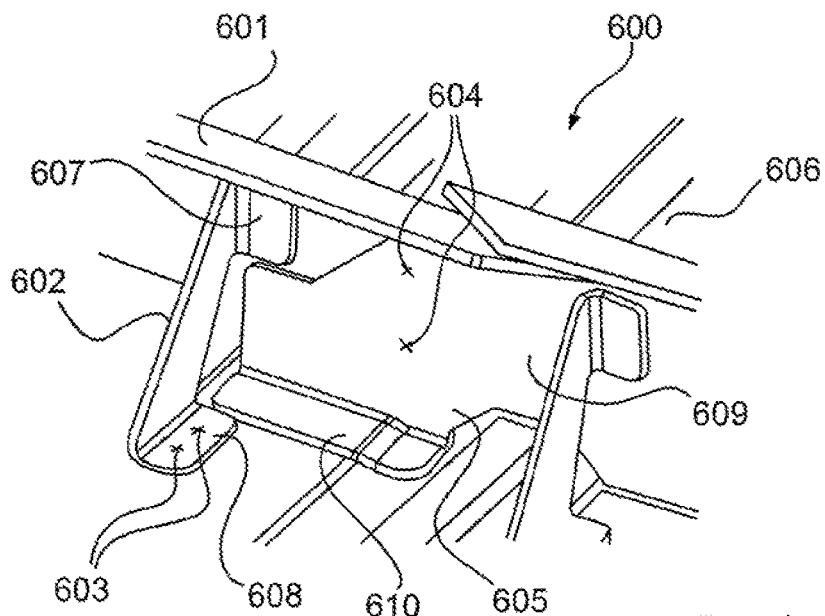
FIG. 6 is a diagrammatic view of a typical installation location of a shearweb and of a frame stabilization element according to a further exemplary embodiment of the invention.

FIG. 6 shows part of a primary aircraft-structure 600 on which a shearweb 605 and a frame stabilization element 602 are arranged. The part shown is a shearweb 605, because this component extends over several stringers, while a clip extends only from a first stringer to a second stringer. Furthermore, a frame element 601 and a stringer 606 are shown in FIG. 6. In the diagram shown, the frame stabilization element, i.e. the cleat or stabilo, is essentially triangular in shape and comprises two attachment regions 607 and 608 that extend so as to be perpendicular to this triangular plane. The cleat 602 has been attached to the stringer by means of rivets/bolts 603. Likewise, rivets/bolts are used in order to firmly connect the cleat 602 in the region 607 to the frame element 601. Likewise, FIG. 6 shows that the shearweb 605 (shearweb or the frame-element shear introduction device 605) comprises a first, larger, main plane 609 that is attached over a large area to the frame element 601 by means of rivets/bolts 604. A second region 610, which extends perpendicularly to the aforesaid, is likewise contained in the shearweb 605 as a flange by means of which the clip can be affixed to the stringer situated below it by means of riveting.

In this arrangement at least two different types of attachment of the aircraft skin to the primary aircraft-structure are possible. The primary aircraft-structure is shown as an example in FIG. 6, including the frame element 601 and the stringer 606. As shown in FIG. 6 the frame stabilization element 602 can be directly connected to the stringer, either by way of rivets or bolts, wherein the aircraft skin in turn is riveted or bonded to said stringer. The rivets/bolts are fastened in the attachment region 608. In this case the stringer and the skin form an integral component. However, the frame stabilization element 602 can also be arranged in such a manner that the attachment region 608 rests directly against the skin, and that the rivets/bolts reach through the frame stabilization element and through the skin. This can be applied to all the exemplary embodiments of the invention, wherein other methods of attaching the aircraft skin to the primary structure are not excluded.

Figure 7:
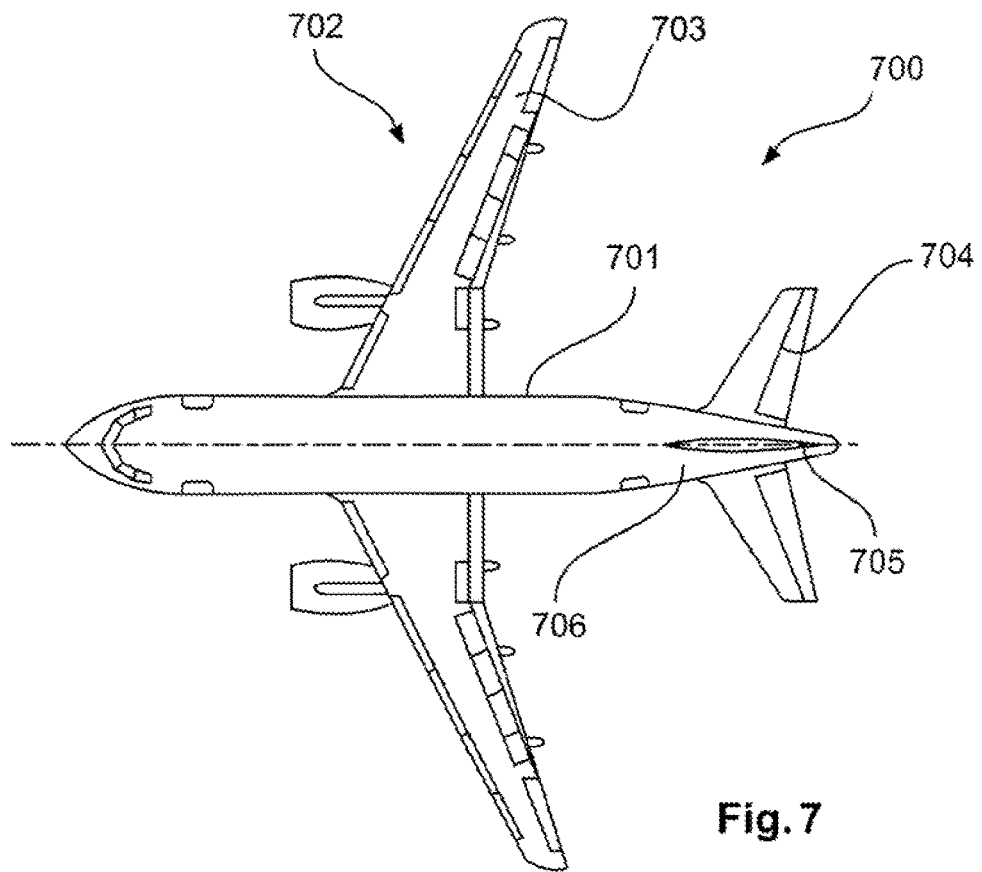
FIG. 7 is a diagrammatic view of an aircraft according to a further exemplary embodiment of the invention.

According to a further exemplary embodiment of the invention, FIG. 7 shows an aircraft 700 that comprises a first part of the aircraft skin 701 in the main fuselage region. In this arrangement the aircraft skin 701 is attached to a primary aircraft-structure as described above by means of several shearwebs and/or several frame stabilization elements. In this embodiment the shearwebs and/or the frame stabilization element used have been manufactured from a fiber-reinforced thermoplastic material by injection molding technology that can result in the above-mentioned advantages to a user. A second part of the aircraft skin 703 has been affixed to the wing 702, wherein in this embodiment ribs are arranged in the primary structure, and consequently rib stabilization elements are used in the primary structure. On the rear fuselage (706) with the horizontal stabilizer and the vertical stabilizer (tail plane) a third part of the aircraft skin (704, 705) is attached, wherein in this embodiment ribs are arranged in the primary structure, and consequently in this embodiment rib stabilization elements are used.

In other words, according to a further exemplary embodiment of the invention, FIG. 7 shows an aircraft that comprises a primary aircraft-structure with several frame elements and several ribs and an aircraft skin. Likewise, the aircraft comprises several shearwebs, clips, frame stabilization elements and rib stabilization elements. Wherein by means of the shearwebs and the frame stabilization elements the first part of the aircraft skin is attached to the frame elements of the primary aircraft-structure, and wherein by means of shearwebs and rib stabilization elements the second part of the aircraft skin is attached to the respective ribs of the primary aircraft-structure. Furthermore, at least one shearweb, a clip, a frame stabilization element or a rib stabilization element has been manufactured from a fiber-reinforced thermoplastic composition by means of injection molding, as described in this document.

In addition, it should be pointed out that "comprising" does not exclude other elements or steps, and "a" or "one" does not exclude a plural number. Furthermore, it should be pointed out that the characteristics which have been described with reference to one of the above exemplary embodiments can also be used in combination with other characteristics of other exemplary embodiments described above. In particular, reference characters in the claims are not to be interpreted as limitations.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An injection molding method for the manufacture of a primary-structure connection element for attaching an aircraft skin to a primary aircraft-structure, the method comprising:
providing a fiber-reinforced thermoplastic composition;
melting the fiber-reinforced thermoplastic composition;
injecting the fiber-reinforced thermoplastic composition into an injection molding device comprising an injection mold for the manufacture of the primary-structure connection element; and
removing the produced primary-structure connection element from the injection molding device,
wherein the produced primary-structure connection element has a modulus of elasticity of a value range of E≥30 Gpa.

2. The method of claim 1,
wherein the composition comprises carbon fibers and/or glass fibers.

3. The method of claim 2,
wherein the following ratio L/d applies to the largest fibers of the carbon fibers and/or to the largest fibers of the glass fibers in terms of the length L of the fibers and in terms of the diameter d of the fibers: L/d≥10, L/d≥50, L/d≥75, or L/d≥100.

4. The method of claim 1,
wherein the composition comprises carbon fibers with a modulus of elasticity E of a value of E≥250 GPa, E≥300 GPa or E≥350 GPa, and/or wherein the composition comprises glass fibers with a modulus of elasticity E of a value of E≥70 GPa, E≥85 GPa or E≥95 GPa.

5. The method of claim 1, the method further comprising:
inserting a reinforcement element in the injection molding device; and
connecting the reinforcement element with the injected composition in the injection molding device.

6. The method of claim 1,
wherein the composition comprises at least one of polyphenylene sulfide (PPS) and polyetherether ketone (PEEK).

7. The method of claim 1,
wherein the composition comprises fibers which on average have a length of between 0.1 mm and 5 mm.

8. A primary-structure connection element for attaching an aircraft skin to a primary aircraft-structure of an aircraft,
wherein the primary-structure connection element is configured as a shearweb, frame stabilization element, clip or as a rib stabilization element, and
wherein the primary-structure connection element is manufactured from a fiber-reinforced thermoplastic composition with the use of injection molding, and
wherein the primary-structure connection element has a modulus of elasticity of a value range of E≥30 Gpa.

9. The primary-structure connection element according to claim 8,
wherein the composition comprises carbon fibers and/or glass fibers,
and wherein the following ratio L/d applies to the largest fibers of the carbon fibers and/or to the largest fibers of the glass fibers in terms of the length L of the fibers and in terms of the diameter d of the fibers: L/d≥10, L/d≥50, L/d≥75, or L/d≥100.

10. The primary-structure connection element according to claim 8,
wherein the primary-structure connection element comprises a first flange for establishing a connection to the aircraft skin, and
wherein the primary-structure connection element comprises a second flange for establishing a connection to the frame element.

11. The primary-structure connection element according to claim 8,
wherein the primary-structure connection element has a modulus of elasticity E in the range of E≥35 GPa, or E≥40 GPa.

12. An aircraft comprising
a primary aircraft-structure with at least one frame element and at least one rib;
an aircraft skin;
a shearweb or a clip;
a frame stabilization element; and
a rib stabilization element,
wherein a first part of the aircraft skin is attached to the frame element of the primary aircraft-structure, and a second part of the aircraft skin is attached to the rib of the primary aircraft-structure,
wherein by the shearweb or the clip and the frame stabilization element the first part of the aircraft skin is attached to the frame element of the primary aircraft-structure, and
wherein by the rib stabilization element the second part of the aircraft skin is attached to the rib of the primary aircraft-structure,
wherein at least one element from the group consisting of the shearweb and the clip, the frame stabilization element and the rib stabilization element is manufactured from a fiber-reinforced thermoplastic composition by injection molding, and
wherein the at least one element from the group consisting of the shearweb and the clip, the frame stabilization element and the rib stabilization element has a modulus of elasticity of a value range of E≥30 Gpa.

* * * * *